United States Patent
Yang et al.

(10) Patent No.: US 10,477,435 B2
(45) Date of Patent: Nov. 12, 2019

(54) RESOURCE ALLOCATION METHOD AND APPARATUS

(71) Applicant: HUAWEI TECHNOLOGIES CO., LTD., Shenzhen (CN)

(72) Inventors: Changqing Yang, Beijing (CN); Yong Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/205,302

(22) Filed: Nov. 30, 2018

(65) Prior Publication Data
US 2019/0104440 A1 Apr. 4, 2019

Related U.S. Application Data

(63) Continuation of application No. PCT/CN2016/084073, filed on May 31, 2016.

(51) Int. Cl.
*H04W 28/16* (2009.01)
*H04W 84/04* (2009.01)
*H04W 92/12* (2009.01)

(52) U.S. Cl.
CPC .......... *H04W 28/16* (2013.01); *H04W 84/045* (2013.01); *H04W 92/12* (2013.01)

(58) Field of Classification Search
CPC ..... H04W 40/02; H04W 72/04; H04W 16/14; H04W 36/26; H04W 36/30; H04W 48/06; H04W 48/08; H04W 72/0446; H04W 72/085; H04W 74/0808; H04W 84/047; H04W 84/12; H04W 92/02; H04W 84/04; H04W 28/16; H04W 84/045; H04B 7/026; H04B 7/155; H04B 7/15528

USPC .......... 455/449, 7, 9; 370/332, 461; 375/132
See application file for complete search history.

(56) References Cited

U.S. PATENT DOCUMENTS

| | | | | |
|---|---|---|---|---|
| 9,622,277 | B1* | 4/2017 | Sun | H04W 40/20 |
| 2009/0168798 | A1* | 7/2009 | Jinxia | H04W 16/14 370/461 |
| 2012/0127915 | A1 | 5/2012 | Moberg et al. | |
| 2012/0264368 | A1* | 10/2012 | Aminaka | H04B 7/155 455/9 |
| 2012/0307633 | A1* | 12/2012 | Collings | H04W 72/0486 370/230 |
| 2013/0034043 | A1 | 2/2013 | Yu et al. | |

(Continued)

FOREIGN PATENT DOCUMENTS

| | | |
|---|---|---|
| CN | 101883435 A | 11/2010 |
| CN | 102170676 A | 6/2011 |

(Continued)

*Primary Examiner* — Nathan S Taylor
(74) *Attorney, Agent, or Firm* — Kilpatrick Townsend & Stockton LLP

(57) ABSTRACT

Embodiments of the present invention provide a resource allocation method and apparatus. A central control node determines a target backhaul node for a normal small cell from M candidate backhaul nodes and communication link resource information between the normal small cell and the target backhaul node based on access link resource pre-occupation information of the normal small cell, link quality information between the normal small cell and each of the M candidate backhaul nodes, and available backhaul link resource information sent by the M candidate backhaul nodes.

18 Claims, 5 Drawing Sheets

(56) References Cited

U.S. PATENT DOCUMENTS

| | | | |
|---|---|---|---|
| 2013/0090055 A1* | 4/2013 | Pitakdumrongkija ... | H04B 7/15 455/9 |
| 2013/0142136 A1* | 6/2013 | Pi ..................... | H04W 28/0289 370/329 |
| 2013/0250773 A1* | 9/2013 | Ohta ................... | H04B 7/155 370/241 |
| 2015/0119046 A1* | 4/2015 | Radulescu ............. | H04L 43/10 455/438 |
| 2015/0181455 A1* | 6/2015 | Song .................. | H04W 28/0205 455/452.1 |
| 2015/0245272 A1* | 8/2015 | Lindoff ................ | H04W 48/06 370/332 |
| 2015/0312768 A1* | 10/2015 | Tokgoz ................ | H04W 16/04 370/232 |
| 2015/0358959 A1* | 12/2015 | Meshkati .......... | H04W 72/0413 370/329 |
| 2016/0165512 A1* | 6/2016 | Nishioka .............. | H04L 45/125 370/252 |
| 2016/0234841 A1* | 8/2016 | Pao ................... | H04W 72/1226 |

FOREIGN PATENT DOCUMENTS

| | | | |
|---|---|---|---|
| CN | 103477698 A | 12/2013 | |
| EP | 2914042 A1 | 9/2015 | |
| EP | 3101950 A1 | 12/2016 | |
| WO | 2015127598 A1 | 9/2015 | |

* cited by examiner

RESOURCE ALLOCATION METHOD AND APPARATUS

CROSS-REFERENCE TO RELATED APPLICATIONS

This application is a continuation of International Application No. PCT/CN2016/084073, filed on May 31, 2016, the disclosure of which is hereby incorporated by reference in its entirety.

TECHNICAL FIELD

Embodiments of the present invention relate to communications technologies, and in particular, to a resource allocation method and apparatus in a wireless communications system.

BACKGROUND

A wireless communications system includes an access device and a core network device. The access device is a device that provides an access service for a subscriber served the access device. Backhaul communication is communication between the access device and the core network device. Generally, the access device communicates with the core network device by using a relay device, and both a link between the access device and the relay device and a link between the relay device and the core network device are referred to as a backhaul link. A dedicated backhaul link resource is configured for the backhaul link between the relay device and the core network device, for example, an optical fiber or a microwave. A wireless backhaul technology is used between the access device and the relay device.

In the prior art, the access device determines, according to a proximity principle, a relay device closest to the access device as a backhaul node, and performs backhaul communication with the core network device by using the determined backhaul node.

However, in the foregoing solution, the determined backhaul node may not be a most appropriate backhaul node, and therefore communication resources may be improperly allocated between the access device and the core network device, causing poor performance of transmission between the access device and the core network device and reducing system performance. Therefore, a new backhaul communication resource allocation solution is required, to implement better backhaul communication resource allocation between the access device and the core network device and improve system performance.

SUMMARY

Embodiments of the present invention provide a resource allocation method and apparatus, to improve performance of transmission between an access device and a core network device.

According to a first aspect, an embodiment of the present invention provides a resource allocation method, including:

pre-estimating, by a normal small cell, access link resource pre-occupation information of the normal small cell, and sending a first message to a central control node, where the first message includes the access link resource pre-occupation information of the normal small cell; further measuring, by the normal small cell, link quality information between the normal small cell and a plurality of candidate backhaul nodes, where the candidate backhaul node is a node that has a dedicated backhaul link resource between the node and a core network device; sending a second message to the central control node, where the second message includes the link quality information between the normal small cell and the plurality of candidate backhaul nodes; determining, by the central control node, a target backhaul node for the normal small cell from the plurality of candidate backhaul nodes and communication link resource information between the normal small cell and the target backhaul node based on the access link resource pre-occupation information of the normal small cell, the link quality information between the normal small cell and each of the plurality of candidate backhaul nodes, and available backhaul link resource information sent by the plurality of candidate backhaul nodes; and sending, by the central control node, a third message to the normal small cell, where the third message includes an identifier of the target backhaul node and the communication link resource information between the normal small cell and the target backhaul node.

In this embodiment, the target backhaul node for the normal small cell and the communication link resource information between the normal small cell and the target backhaul node are determined by the central control node with reference to the access link resource pre-occupation information of the normal small cell, the link quality information between the normal small cell and each of the plurality of candidate backhaul nodes, and the available backhaul link resource information sent by the plurality of candidate backhaul nodes. Therefore, the target backhaul node is determined more properly, and the communication link resource information between the normal small cell and the target backhaul node is also more proper, improving system performance.

In a possible design, the method further includes:

sending, by the central control node, a fourth message to the target backhaul node, where the fourth message includes the communication link resource information between the normal small cell and the target backhaul node, so that the target backhaul node learns of resources that are used as backhaul link resources of the normal small cell.

In a possible design, the fourth message further includes an identifier of the normal small cell, so that the target backhaul node learns of normal small cells for which the target backhaul node provides a backhaul service.

In a possible design, the determining, by the central control node, a target backhaul node for the normal small cell from M candidate backhaul nodes based on the access link resource pre-occupation information of the normal small cell, the link quality information between the normal small cell and each of the M candidate backhaul nodes, and available backhaul link resource information sent by the M candidate backhaul nodes includes:

calculating, by the central control node based on the access link resource pre-occupation information of the normal small cell, the link quality information between the normal small cell and each of the M candidate backhaul nodes, and the available backhaul link resource information sent by the M candidate backhaul nodes, a corresponding throughput sum of all subscribers served by the normal small cell for each candidate backhaul node, to obtain M throughput sums; and determining, by the central control node, a candidate backhaul node corresponding to a maximum throughput sum in the M throughput sums as the target backhaul node.

In a possible design, before the central control node receives the first message sent by the normal small cell, the method further includes:

sending, by the central control node, a first indication message to the normal small cell, where the first indication message is used to instruct the normal small cell to report the access link resource pre-occupation information of the normal small cell, the first indication message includes first reporting information and/or a first reporting trigger condition, and the first reporting trigger condition includes periodic triggering or event triggering.

In a possible design, before the sending, by the central control node, a first indication message to the normal small cell, the method further includes:

sending, by the central control node, a second indication message to the normal small cell, where the second indication message is used to instruct the normal small cell to measure the access link resource pre-occupation information of the normal small cell, the second indication message includes first measurement information and/or a first measurement trigger condition, and the first measurement trigger condition includes periodic triggering or event triggering.

In a possible design, before the central control node receives the second message sent by the normal small cell, the method further includes:

sending, by the central control node, a third indication message to the normal small cell, where the third indication message is used to instruct the normal small cell to report the link quality information between the normal small cell and each of the M candidate backhaul nodes, the third indication message includes second reporting information and/or a second reporting trigger condition, and the second reporting trigger condition includes periodic triggering or event triggering.

In a possible design, before the sending, by the central control node, a third indication message to the normal small cell, the method further includes:

sending, by the central control node, a fourth indication message to the normal small cell, where the fourth indication message is used to instruct the normal small cell to measure the link quality information between the normal small cell and each of the M candidate backhaul nodes, the fourth indication message includes second measurement information and/or a second measurement trigger condition, and the second measurement trigger condition includes periodic triggering or event triggering.

In a possible design, the second measurement information includes at least one of the following:
 a quantity of to-be-measured candidate backhaul nodes;
 a measurement manner; and
 precision of a measured parameter.

According to a second aspect, an embodiment of the present invention provides a resource allocation method, including:

sending, by a normal small cell, a first message to a central control node, where the first message includes access link resource pre-occupation information of the normal small cell; sending a second message to the central control node, where the second message includes link quality information between the normal small cell and each of M candidate backhaul nodes, and M is an integer greater than or equal to 2; receiving a third message sent by the central control node, where the third message includes an identifier of a target backhaul node for the normal small cell and communication link resource information between the normal small cell and the target backhaul node; and sending data to the target backhaul node, and/or receiving data from the target backhaul node, by using the communication link resource information between the normal small cell and the target backhaul node.

In this embodiment, the target backhaul node is determined more properly, and the communication link resource information between the normal small cell and the target backhaul node is also more proper. Therefore, the data is sent to the target backhaul node, and/or the data is received from the target backhaul node, by using the communication link resource information between the normal small cell and the target backhaul node, improving system performance.

In a possible design, before the sending, by a normal small cell, a first message to a central control node, the method further includes:

receiving, by the normal small cell, a first indication message sent by the central control node, where the first indication message is used to instruct the normal small cell to report the access link resource pre-occupation information of the normal small cell, the first indication message includes first reporting information and/or a first reporting trigger condition, and the first reporting trigger condition includes periodic triggering or event triggering.

In a possible design, before the normal small cell reports the access link resource pre-occupation information of the normal small cell based on the first indication message, the method further includes:

receiving, by the normal small cell, a second indication message sent by the central control node, where the second indication message is used to instruct the normal small cell to measure the access link resource pre-occupation information of the normal small cell, the second indication message includes first measurement information and/or a first measurement trigger condition, and the first measurement trigger condition includes periodic triggering or event triggering; and measuring, by the normal small cell, the access link resource pre-occupation information of the normal small cell based on the second indication message.

In a possible design, before the sending, by the normal small cell, a second message to the central control node, the method further includes:

receiving, by the normal small cell, a third indication message sent by the central control node, where the third indication message is used to instruct the normal small cell to report the link quality information between the normal small cell and each of the M candidate backhaul nodes, the third indication message includes second reporting information and/or a second reporting trigger condition, and the second reporting trigger condition includes periodic triggering or event triggering.

In a possible design, before the receiving, by the normal small cell, a third indication message sent by the central control node, the method further includes:

receiving, by the normal small cell, a fourth indication message sent by the central control node, where the fourth indication message is used to instruct the normal small cell to measure the link quality information between the normal small cell and each of the M candidate backhaul nodes, the fourth indication message includes second measurement information and/or a second measurement trigger condition, and the second measurement trigger condition includes periodic triggering or event triggering.

In a possible design, the second measurement information includes at least one of the following:
 a quantity of to-be-measured candidate backhaul nodes;
 a measurement manner; and
 precision of a measured parameter.

According to a third aspect, an embodiment of the present invention provides a resource allocation method, including:

receiving, by a target backhaul node, a second message sent by a central control node, where the second message includes link quality information between a normal small cell and the target backhaul node;

receiving, by the target backhaul node, a fourth message sent by the central control node, where the fourth message includes communication link resource information between the normal small cell and the target backhaul node; and sending, by the target backhaul node, data to the normal small cell, and/or receiving data from the normal small cell, by using the communication link resource information between the normal small cell and the target backhaul node.

In this embodiment, the target backhaul node is determined more properly, and the communication link resource information between the normal small cell and the target backhaul node is also more proper. Therefore, the data is sent to the normal small cell, and/or the data is received from the normal small cell, by using the communication link resource information between the normal small cell and the target backhaul node, improving system performance.

In a possible design, the fourth message further includes an identifier of the normal small cell.

According to a fourth aspect, an embodiment of the present invention provides a resource allocation apparatus, including:

a receiving module, configured to receive a first message sent by a normal small cell, where the first message includes access link resource pre-occupation information of the normal small cell, where the receiving module is further configured to receive a second message sent by the normal small cell, where the second message includes link quality information between the normal small cell and each of M candidate backhaul nodes, and M is an integer greater than or equal to 2, and the receiving module is further configured to receive available backhaul link resource information sent by the M candidate backhaul nodes;

a processing module, configured to determine a target backhaul node for the normal small cell from the M candidate backhaul nodes and communication link resource information between the normal small cell and the target backhaul node based on the access link resource pre-occupation information of the normal small cell, the link quality information between the normal small cell and each of the M candidate backhaul nodes, and the available backhaul link resource information sent by the M candidate backhaul nodes; and a sending module, configured to send a third message to the normal small cell, where the third message includes an identifier of the target backhaul node and the communication link resource information between the normal small cell and the target backhaul node.

In a possible design, the sending module is further configured to send a fourth message to the target backhaul node, where the fourth message includes the communication link resource information between the normal small cell and the target backhaul node.

In a possible design, the fourth message further includes an identifier of the normal small cell.

In a possible design, the processing module is specifically configured to: calculate, based on the access link resource pre-occupation information of the normal small cell, the link quality information between the normal small cell and each of the M candidate backhaul nodes, and the available backhaul link resource information sent by the M candidate backhaul nodes, a corresponding throughput sum of all subscribers served by the normal small cell for each candidate backhaul node, to obtain M throughput sums; and determine a candidate backhaul node corresponding to a maximum throughput sum in the M throughput sums as the target backhaul node.

In a possible design, the sending module is further configured to send a first indication message to the normal small cell, where the first indication message is used to instruct the normal small cell to report the access link resource pre-occupation information of the normal small cell, the first indication message includes first reporting information and/or a first reporting trigger condition, and the first reporting trigger condition includes periodic triggering or event triggering.

In a possible design, the sending module is further configured to send a second indication message to the normal small cell, where the second indication message is used to instruct the normal small cell to measure the access link resource pre-occupation information of the normal small cell, the second indication message includes first measurement information and/or a first measurement trigger condition, and the first measurement trigger condition includes periodic triggering or event triggering.

In a possible design, the sending module is further configured to send a third indication message to the normal small cell, where the third indication message is used to instruct the normal small cell to report the link quality information between the normal small cell and each of the M candidate backhaul nodes, the third indication message includes second reporting information and/or a second reporting trigger condition, and the second reporting trigger condition includes periodic triggering or event triggering.

In a possible design, the sending module is further configured to send a fourth indication message to the normal small cell, where the fourth indication message is used to instruct the normal small cell to measure the link quality information between the normal small cell and each of the M candidate backhaul nodes, the fourth indication message includes second measurement information and/or a second measurement trigger condition, and the second measurement trigger condition includes periodic triggering or event triggering.

In a possible design, the second measurement information includes at least one of the following:

a quantity of to-be-measured candidate backhaul nodes;

a measurement manner; and precision of a measured parameter.

According to a fifth aspect, an embodiment of the present invention provides a resource allocation apparatus, including:

a sending module, configured to send a first message to a central control node, where the first message includes access link resource pre-occupation information of a normal small cell, where the sending module is further configured to send a second message to the central control node, where the second message includes link quality information between the normal small cell and each of M candidate backhaul nodes, and M is an integer greater than or equal to 2;

a receiving module, configured to receive a third message sent by the central control node, where the third message includes an identifier of a target backhaul node for the normal small cell and communication link resource information between the normal small cell and the target backhaul node; and a control module, configured to: control the sending module to send data to the target backhaul node by using the communication link resource information between the normal small cell and the target backhaul node, and/or control the receiving module to receive data from the target backhaul node by using the communication link resource information between the normal small cell and the target backhaul node In a possible design, the receiving module is further configured to receive a first indication message sent by the central control node, where the first indication message is used to instruct the normal small cell to report the access link resource pre-occupation information of the normal small cell, and the first indication message includes first reporting information and/or a first reporting trigger condition.

In a possible design, the receiving module is further configured to receive a second indication message sent by the central control node, where the second indication message is used to instruct the normal small cell to measure the access link resource pre-occupation information of the normal small cell, and the second indication message includes first measurement information and/or a first measurement trigger condition; and the control module is further configured to measure the access link resource pre-occupation information of the normal small cell based on the second indication message.

In a possible design, the receiving module is further configured to receive a third indication message sent by the central control node, where the third indication message is used to instruct the normal small cell to report the link quality information between the normal small cell and each of the M candidate backhaul nodes, and the third indication message includes second reporting information and/or a second reporting trigger condition.

In a possible design, the receiving module is further configured to receive a fourth indication message sent by the central control node, where the fourth indication message is used to instruct the normal small cell to measure the link quality information between the normal small cell and each of the M candidate backhaul nodes, and the fourth indication message includes second measurement information and/or a second measurement trigger condition.

In a possible design, the second measurement information includes at least one of the following:

a quantity of to-be-measured candidate backhaul nodes;

a measurement manner; and precision of a measured parameter.

In a possible design, the first reporting trigger condition includes:

periodic triggering or event triggering.

In a possible design, the first measurement trigger condition includes:

periodic triggering or event triggering.

In a possible design, the second reporting trigger condition includes:

periodic triggering or event triggering.

In a possible design, the second measurement trigger condition includes:

periodic triggering or event triggering.

According to a sixth aspect, an embodiment of the present invention provides a resource allocation apparatus, including:

a receiving module, configured to receive a second message sent by a central control node, where the second message includes link quality information between a normal small cell and a target backhaul node, where the receiving module is further configured to receive a fourth message sent by the central control node, where the fourth message includes communication link resource information between the normal small cell and the target backhaul node; and a control module, configured to: control a sending module to send data to the normal small cell by using the communication link resource information between the normal small cell and the target backhaul node, and/or control the receiving module to receive data from the normal small cell by using the communication link resource information between the normal small cell and the target backhaul node.

In a possible design, the fourth message further includes an identifier of the normal small cell.

According to a seventh aspect, an embodiment of the present invention provides a resource allocation apparatus, including:

a receiver, configured to receive a first message sent by a normal small cell, where the first message includes access link resource pre-occupation information of the normal small cell, where the receiver is further configured to receive a second message sent by the normal small cell, where the second message includes link quality information between the normal small cell and each of M candidate backhaul nodes, and M is an integer greater than or equal to 2, and the receiver is further configured to receive available backhaul link resource information sent by the M candidate backhaul nodes;

a processor, configured to determine a target backhaul node for the normal small cell from the M candidate backhaul nodes and communication link resource information between the normal small cell and the target backhaul node based on the access link resource pre-occupation information of the normal small cell, the link quality information between the normal small cell and each of the M candidate backhaul nodes, and the available backhaul link resource information sent by the M candidate backhaul nodes; and a transmitter, configured to send a third message to the normal small cell, where the third message includes an identifier of the target backhaul node and the communication link resource information between the normal small cell and the target backhaul node.

According to an eighth aspect, an embodiment of the present invention provides a resource allocation apparatus, including:

a transmitter, configured to send a first message to a central control node, where the first message includes access link resource pre-occupation information of a normal small cell, where the transmitter is further configured to send a second message to the central control node, where the second message includes link quality information between the normal small cell and each of M candidate backhaul nodes, and M is an integer greater than or equal to 2;

a receiver, configured to receive a third message sent by the central control node, where the third message includes an identifier of a target backhaul node for the normal small cell and communication link resource information between the normal small cell and the target backhaul node; and a controller, configured to: control the transmitter to send data to the target backhaul node by using the communication link resource information between the normal small cell and the target backhaul node, and/or control the receiver to receive data from the target backhaul node by using the communication link resource information between the normal small cell and the target backhaul node.

According to a ninth aspect, an embodiment of the present invention provides a resource allocation apparatus, including:

a receiver, configured to receive a second message sent by a central control node, where the second message includes link quality information between a normal small cell and a target backhaul node, where the receiver is further configured to receive a fourth message sent by the central control node, where the fourth message includes communication link resource information between the normal small cell and the target backhaul node; and a controller, configured to: control a transmitter to send data to the normal small cell by using the communication link resource information between the normal small cell and the target backhaul node, and/or control the receiver to receive data from the normal small cell by using the communication link resource information between the normal small cell and the target backhaul node.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may derive other drawings from these accompanying drawings without creative efforts.

DESCRIPTION OF EMBODIMENTS

Figure 1:
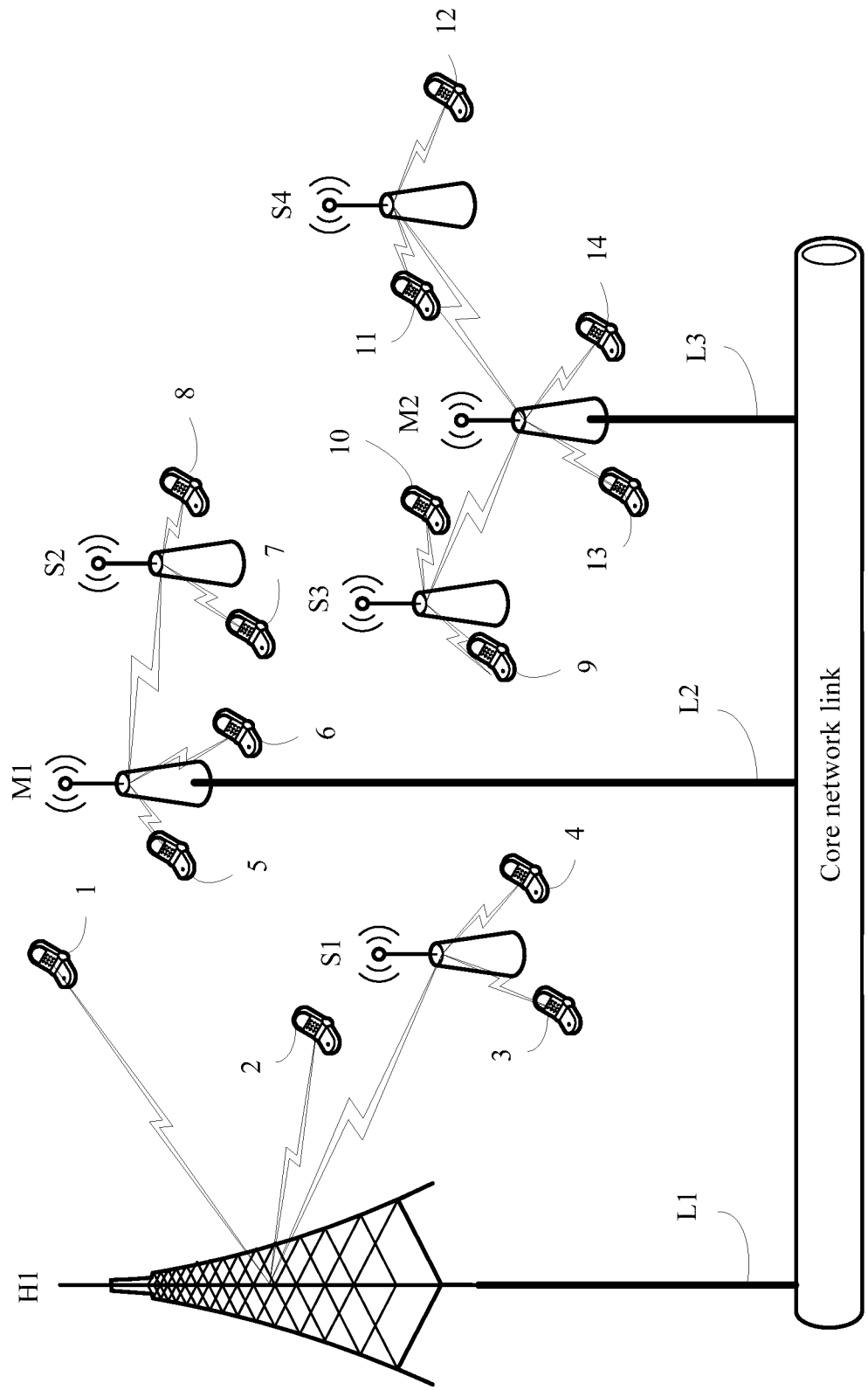
FIG. 1 is a schematic diagram of a possible application scenario of the present invention.

The following clearly describes the technical solutions in the embodiments of this application with reference to the accompanying drawings in the embodiments of this application. Apparently, the described embodiments are merely some but not all of the embodiments of this application. All other embodiments obtained by persons of ordinary skill in the art based on the embodiments of this application without creative efforts shall fall within the protection scope of this application.

Example embodiments are described in detail herein, and examples of the example embodiments are presented in the accompanying drawings. When the following description relates to the accompanying drawings, same numbers in different accompanying drawings represent a same or similar element unless otherwise stated. Implementations described in the following example embodiments do not represent all implementations consistent with the present invention. On the contrary, they are only examples of apparatuses and methods that are described in the appended claims in detail and that are consistent with some aspects of the present invention.

It should be clear that the described embodiments are merely a part rather than all of the embodiments of the present invention. All other embodiments obtained by persons of ordinary skill in the art based on the embodiments of the present invention without creative efforts shall fall within the protection scope of the present invention.

The terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, although terms such as "first", "second", and "third" may be used in embodiments of the present invention to describe xxx, the xxx should not be limited by these terms. These terms are merely used to distinguish between the xxx. For example, without departing from the scope of the embodiments of the present invention, a first xxx may also be referred to as a second xxx, and similarly the second xxx may also be referred to as the first xxx.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

It should further be noted that the terms "include", "comprise", or any other variant thereof are intended to cover a non-exclusive inclusion, so that a commodity or a system that includes a list of elements not only includes those elements but also includes other elements that are not expressly listed, or further includes elements inherent to such a commodity or system. An element preceded by "includes a . . . " does not, without more constraints, preclude the existence of additional identical elements in the commodity or system that includes the element.

A network architecture and a service scenario that are described in the embodiments of the present invention are used to describe the technical solutions in the embodiments of the present invention more clearly, but are not intended to limit the technical solutions provided in the embodiments of the present invention. Persons of ordinary skill in the art may learn that, with evolution of the network architecture and emergence of a new service scenario, the technical solutions provided in the embodiments of the present invention are also applicable to a similar technical problem. As shown in FIG. 1, FIG. 1 is a schematic diagram of a possible application scenario of the present invention. The application scenario of the present invention is a wireless communications system. User equipment (UE) accesses a core network (CN) by using a macro base station, a primary small cell, or a normal small cell. The primary small cell and the normal small cell are small cells. A difference is that the primary small cell is a small cell for which a dedicated backhaul link resource is configured on a backhaul link between the primary small cell and a core network device, while the normal small cell is a small cell that does not have a dedicated backhaul link resource and that needs to communicate with a core network device by using a target backhaul node.

The technology described in the embodiments of the present invention may be applied to a Long Term Evolution (LTE) system or other wireless communications systems that use various radio access technologies, for example, systems that use access technologies such as Code Division Multiple Access, Frequency Division Multiple Access, Time Division Multiple Access, orthogonal frequency division multiple access, and single carrier frequency division multiple access. In addition, the technology may also be applied to a subsequent evolved system of the LTE system, for example, a 5th generation system of the LTE system.

The wireless communications system in FIG. 1 includes a macro base station H1, at least one primary small cell (FIG. 1 shows a primary small cell M1 and a primary small cell M2), at least one normal small cell (FIG. 1 shows a normal small cell S1 to a normal small cell S4), and at least one UE (FIG. 1 shows UE 1 to UE 14). A dedicated backhaul link resource exists between the macro base station and a core network link and between the primary small cell and the core network link. The dedicated backhaul link resource may be a resource such as an optical fiber or a microwave. The normal small cell needs to be wirelessly connected to a neighboring macro base station or primary small cell to resolve a backhaul problem of the normal small cell. FIG. 1 shows three links: an access link, a non-ideal backhaul link, and an ideal backhaul link.

Access Link

The access link is a link between UE and an access device. The macro base station, the primary small cell, and the normal small cell all may be used as the access device for the UE. For example, in FIG. 1, both a link between the UE 1 and the macro base station H1 and a link between the UE 2 and the macro base station H1 are access links, both a link between the UE 3 and the normal small cell S1 and a link between the UE 4 and the normal small cell S1 are access links, both a link between the UE 5 and the primary small cell M1 and a link between the UE 6 and the primary small cell M1 are access links, both a link between the UE 7 and the normal small cell S2 and a link between the UE 8 and the normal small cell S2 are access links, both a link between the UE 9 and the normal small cell S3 and a link between the UE 10 and the normal small cell S3 are access links, both a link between the UE 11 and the normal small cell S4 and a link between the UE 12 and the normal small cell S4 are access links, and both a link between the UE 13 and the primary small cell M2 and a link between the UE 14 and the primary small cell M2 are access links.

Non-Ideal Backhaul Link

The non-ideal backhaul link is a link between a normal small cell and a target backhaul node. The target backhaul node may be a macro base station, or may be a primary small cell. A base station can be used as the target backhaul node provided that a dedicated backhaul link resource exists between the base station and the core network link.

For example, in FIG. 1, a link between the normal small cell S1 and the macro base station H1 is a non-ideal backhaul link, a link between the normal small cell S2 and the primary small cell M1 is a non-ideal backhaul link, a link between the normal small cell S3 and the primary small cell M2 is a non-ideal backhaul link, and a link between the normal small cell S4 and the primary small cell M2 is a non-ideal backhaul link.

Ideal Backhaul Link

The ideal backhaul link is a link that has a dedicated backhaul link resource between a base station and a core network link. For example, in FIG. 1, a link between the macro base station H1 and the core network link is an ideal backhaul link L1, a link between the primary small cell M1 and the core network link is an ideal backhaul link L2, and a link between the primary small cell M2 and the core network link is an ideal backhaul link L3.

However, in an actual application scenario, each of a plurality of primary small cells or macro base stations may be used as a target backhaul node for a same normal small cell. For example, in FIG. 1, for the normal small cell S2, each of the primary small cell M1, the primary small cell M2, and the macro base station H1 may be used as a target backhaul node for the normal small cell S2 (FIG. 1 shows only a backhaul link between the primary small cell M1 and the normal small cell S2). However, how to select a most appropriate target backhaul node from the target backhaul nodes is a problem. In the present invention, an appropriate target backhaul node is determined for the normal small cell with reference to access link resource pre-occupation information of the normal small cell, link quality information between the normal small cell and the macro base station or between the normal small cell and the primary small cell, and available backhaul link resource information (usually referred to as available backhaul link resources) of the macro base station or the primary small cell. For example, the system in FIG. 1 determines the primary small cell M1 as a backhaul node for the normal small cell S2. In this way, a capability of transmission between the user equipment and the core network (including the backhaul link and the access link) is improved, improving system performance.

Each of the macro base station, the primary small cell, and the normal small cell in the present invention may be a base station (BS), an access point (AP), remote radio equipment RRE), a remote radio head (RRH), a remote radio unit (RRU), or the like. This is not specifically limited in the present invention. A correspondence between a cell and each of the macro base station, the primary small cell, and the normal small cell is not limited. One macro base station, primary small cell, or normal small cell may correspond to one or more cells, or one cell may correspond to a plurality of macro base stations, primary small cells, or normal small cells.

The following uses specific embodiments to describe in detail the technical solutions of the present invention. The following several specific embodiments may be combined with each other, and a same or similar concept or process may not be repeatedly described in some embodiments.

For ease of description, in the following embodiments of the present invention, a primary small cell or a macro base station is referred to as a candidate backhaul node, and a target backhaul node that provides a backhaul link resource for a normal small cell is selected from the candidate backhaul node.

Figure 2:
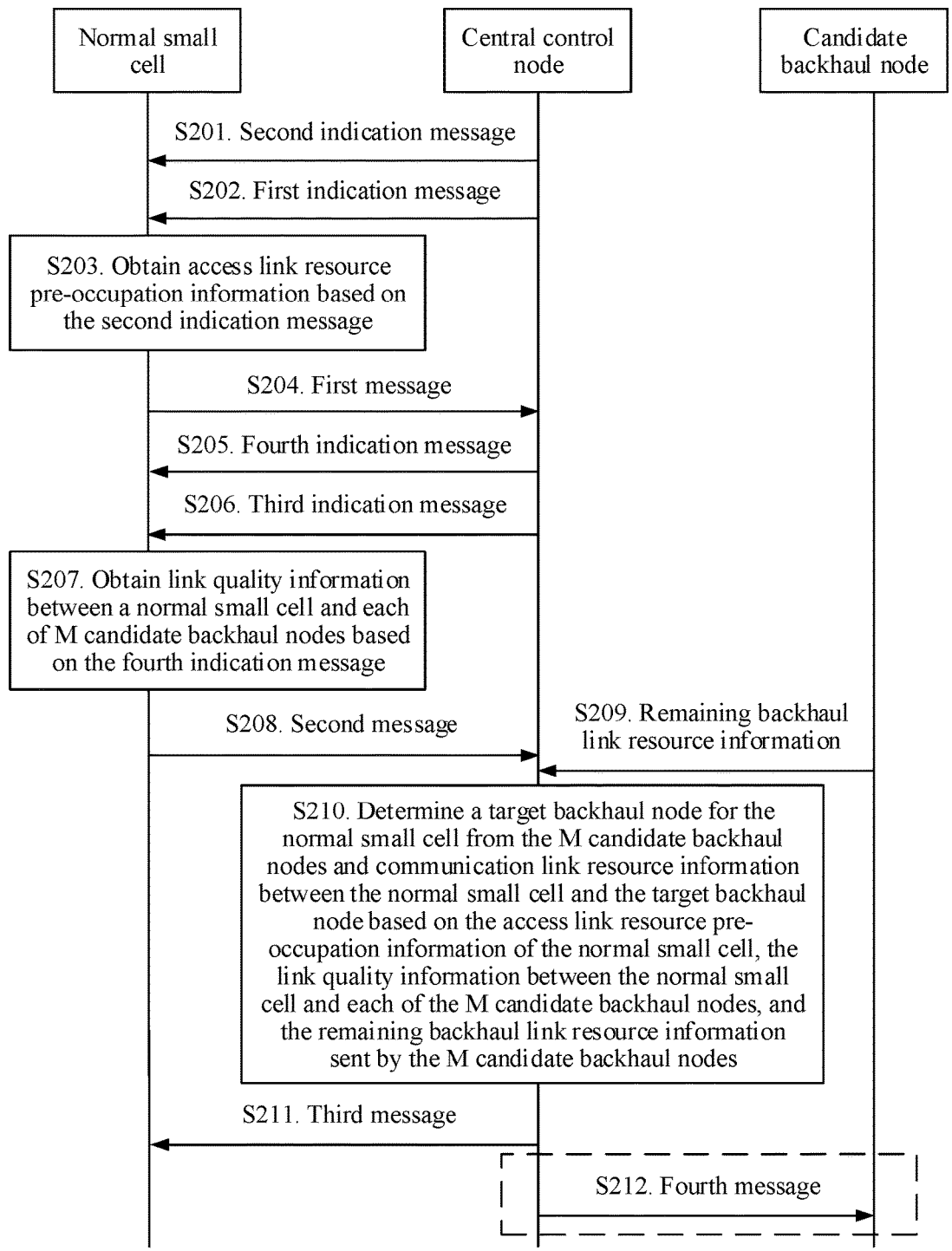
FIG. 2 is a schematic flowchart of a possible resource allocation method according to an embodiment of the present invention.

FIG. 2 is a schematic flowchart of a possible resource allocation method according to an embodiment of the present invention. As shown in FIG. 2, the method in this embodiment is as follows:

S201. A central control node sends a second indication message to a normal small cell.

The second indication message is used to instruct the normal small cell to measure access link resource pre-occupation information of the normal small cell, and the second indication message includes first measurement information and/or a first measurement trigger condition.

The central control node may be deployed independently, or may be deployed in a macro base station or a gateway (not shown in FIG. 1). The gateway is deployed in a core network. This is not limited in the present invention. When the central control node is deployed in the gateway, the central control node exchanges information with the normal small cell by using the macro base station. This is not limited in the present invention. The central control node is responsible for backhaul link resource allocation for all normal small cells within a specific range (for example, a sector). The backhaul link resource allocation includes a backhaul link connection relationship and communication link resource information between the normal small cell and a target backhaul node. The backhaul link connection relationship means which candidate backhaul node is used as a backhaul node for which normal small cell. The communication link resource information between the normal small cell and the target backhaul node is a time-frequency resource used for communication between the normal small cell and the target backhaul node. Specifically, the normal small cell sends data to the target backhaul node, and/or receives data from the target backhaul node, by using the communication link resource information between the normal small cell and the target backhaul node.

The access link resource pre-occupation information includes a time-frequency resource pre-occupation amount required by the normal small cell for meeting a service requirement of a home subscriber. The home subscriber served by the normal small cell is UE that accesses the normal small cell. For example, in FIG. 1, subscribers served by a normal small cell S1 are UE 3 and UE 4, and access link resource pre-occupation information of the normal small cell S1 includes a time-frequency resource pre-occupation amount required by the normal small cell S1 for meeting service requirements of the UE 3 and the UE 4. Because the normal small cell can control the home subscriber to measure channel state information, interference information, service requirement information, a scheduling algorithm, and the like, the normal small cell can relatively accurately estimate the access link resource pre-occupation information based on the information.

Figures 3, 4:
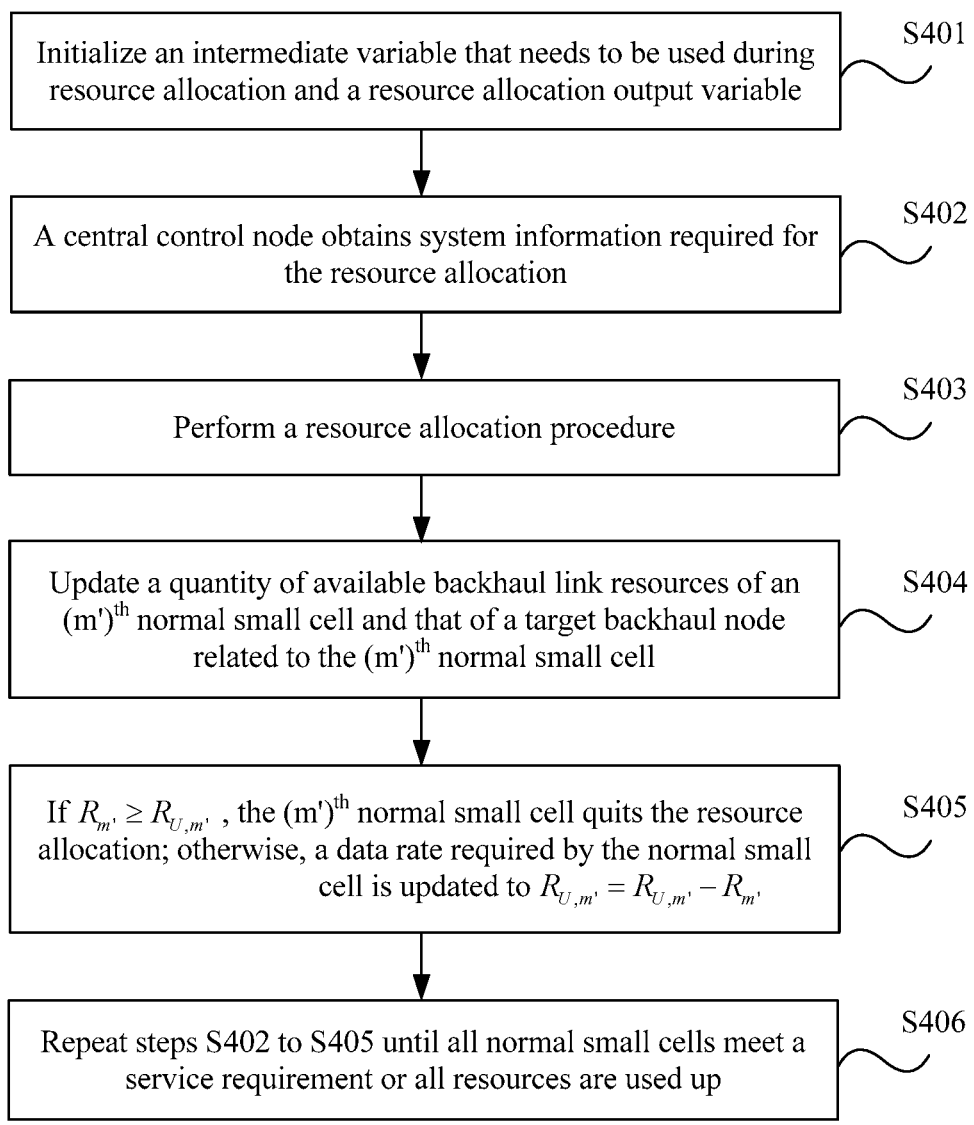
FIG. 3 is a schematic diagram of a possible bitmap of the present invention.
FIG. 4 is a schematic flowchart of another possible resource allocation method according to an embodiment of the present invention.

The central control node can instruct, by using the first measurement information, the normal small cell to measure which parameters and precision for the parameter measurements by the normal small cell. For example, for a particular normal small cell, if transmission efficiency (k bps/PRB) of the normal small cell is estimated based on average channel state information, access link resource pre-occupation information (n/k) PRBs of the normal small cell can be obtained with reference to a total service rate requirement (n bps) of the accessed home subscriber. However, if estimation of the normal small cell is based on finer channel state information or a specific scheduling algorithm, the obtained access link resource pre-occupation information of the normal small cell may be a bitmap with a length of N. As shown in FIG. 3, FIG. 3 is a schematic diagram of a possible bitmap of the present invention. Each bit represents a physical resource block (PRB), where 1 indicates a location of a PRB that is pre-occupied, and 0 indicates a location of a PRB that is not occupied.

The central control node instructs, by using the first measurement trigger condition, the normal small cell when to perform measurement. The first measurement trigger condition may be periodic triggering measurement or event triggering measurement. The periodic triggering measurement is to perform measurement at intervals of a fixed time. For example, the fixed time is 5 s. It is assumed that first measurement is performed at 0 s. Second measurement is performed at 5 s, third measurement is performed at 15 s, fourth measurement is performed at 20 s, and so on. The event triggering measurement is to perform measurement when a particular event occurs or after the particular event occurs. For example, the event may be a change in a quantity of home subscribers accessing the normal small cell, a change in a service of the home subscriber, or any event that may cause a change in the access link resource pre-occupation information of the normal small cell.

S202. The central control node sends a first indication message to the normal small cell.

The first indication message is used to instruct the normal small cell to report the access link resource pre-occupation information of the normal small cell, and the first indication message includes first reporting information and/or a first reporting trigger condition.

The central control node can instruct, by using the first reporting information, the normal small cell to report which parameters and precision for the parameter reporting. The first reporting information may be the same as the first measurement information in S201, or may be a parameter further obtained based on the first measurement information in S201, for example, the access link resource pre-occupation information obtained through resolving based on the channel state information, the interference information, the service requirement information, and the scheduling algorithm.

The central control node instructs, by using the first reporting trigger condition, the normal small cell when to perform reporting. The first reporting trigger condition may also be periodic triggering reporting or event triggering reporting. A period of the first reporting trigger condition may be the same as or different from a period of the first measurement trigger condition. For example, reporting may be performed each time when measurement is performed, or reporting may be performed after measurement is performed for several times. An event of first reporting triggering condition may also be the same as or different from an event of first measurement triggering condition. This is not limited in the present invention.

S203. The normal small cell obtains access link resource pre-occupation information based on the second indication message.

The normal small cell may obtain the access link resource pre-occupation information based on the first measurement information and/or the first measurement trigger condition included in the second indication message in S201.

S204. The normal small cell sends a first message to the central control node based on the first indication message.

The first message includes the access link resource pre-occupation information of the normal small cell.

The normal small cell sends, to the central control node based on the first reporting information and/or the first reporting trigger condition included in the first indication message in S202, the access link resource pre-occupation information obtained in S203.

S205. The central control node sends a fourth indication message to the normal small cell.

The fourth indication message is used to instruct the normal small cell to measure link quality information between the normal small cell and each of M candidate backhaul nodes, and the fourth indication message includes second measurement information and/or a second measurement trigger condition.

The second measurement information includes at least one of the following:
 a quantity of to-be-measured candidate backhaul nodes;
 a to-be-measured parameter;
 a measurement manner; or
 precision of a measured parameter.

The quantity of to-be-measured candidate backhaul nodes is a quantity of candidate backhaul nodes that need to be measured by the normal small cell. For example, if the quantity of to-be-measured candidate backhaul nodes in the second measurement information is 3, the normal small cell measures link quality information between the normal small cell and a candidate backhaul node 1, the normal small cell measures link quality information between the normal small cell and a candidate backhaul node 2, and the normal small cell measures link quality information between the normal small cell and a candidate backhaul node 3. The to-be-measured parameter is a parameter of link quality information that needs to be measured by the normal small cell. For example, the to-be-measured parameter may be a wideband signal to interference plus noise ratio (SINR), or may be a sub-band SINR. The measurement manner may be measurement performed based on a pilot. For example, the second measurement information may instruct the normal small cell to obtain a received signal strength of each to-be-measured candidate backhaul node based on the pilot, and obtain a wideband SINR of each candidate backhaul node by using total received channel strength.

Alternatively, the second measurement information may instruct the normal small cell to perform sub-band SINR measurement on surrounding N candidate backhaul nodes, and indicate a frequency-domain width of a sub-band.

The second measurement trigger condition may be periodic triggering measurement, or may be event triggering measurement. This is not limited in the present invention.

In some embodiments, the second measurement information may alternatively not indicate the quantity of to-be-measured candidate backhaul nodes, but directly indicate an identifier (ID) of the to-be-measured candidate backhaul node. This is not limited in the present invention.

S206. The central control node sends a third indication message to the normal small cell.

The third indication message is used to instruct the normal small cell to report the link quality information between the normal small cell and each of the M candidate backhaul nodes, and the third indication message includes second reporting information and/or a second reporting trigger condition.

The central control node can instruct, by using the second reporting information, the normal small cell to report which parameters and precision for the parameter reporting.

The central control node instructs, by using the second reporting trigger condition, the normal small cell when to perform reporting. The second reporting trigger condition may be periodic triggering reporting or event triggering reporting. A period of the second reporting trigger condition may be the same as a period of the second measurement trigger condition. An event of second event triggering reporting may also be the same as or different from an event of second event triggering measurement. This is not limited in the present invention.

S207. The normal small cell obtains link quality information between the normal small cell and each of M candidate backhaul nodes based on the fourth indication message.

Specifically, the normal small cell obtains, based on the second measurement information and the second measurement trigger condition in S205, the link quality information between the normal small cell and each of the M candidate backhaul nodes.

S208. The normal small cell sends a second message to the central control node based on the third indication message.

The second message includes the link quality information between the normal small cell and each of the M candidate backhaul nodes.

S209. The central control node receives available backhaul link resource information sent by the M candidate backhaul nodes.

The available backhaul link resource information is a backhaul link resource that can be used by the candidate backhaul node, to be specific, an available resource, namely, an available backhaul link resource of the candidate backhaul node other than an allocated resource and a resource that is used to access a link.

S210. The central control node determines a target backhaul node for the normal small cell from the M candidate backhaul nodes and communication link resource information between the normal small cell and the target backhaul node based on the access link resource pre-occupation information of the normal small cell, the link quality information between the normal small cell and each of the M candidate backhaul nodes, and the available backhaul link resource information sent by the M candidate backhaul nodes.

Specifically, the central control node calculates, based on the access link resource pre-occupation information of the normal small cell, the link quality information between the normal small cell and each of the M candidate backhaul nodes, and the available backhaul link resource information sent by the M candidate backhaul nodes, a corresponding throughput sum of all subscribers served by the normal small cell for each candidate backhaul node, to obtain M throughput sums. The central control node determines a candidate backhaul node corresponding to a maximum throughput sum in the M throughput sums as the target backhaul node.

More specifically, all candidate backhaul nodes for the normal small cell are determined. A throughput sum of subscribers served by the normal small cell for a target backhaul node is assumed when each candidate backhaul node is used as the target backhaul node for the normal small cell. For example, in FIG. 1, all candidate backhaul nodes for a normal small cell S2 are a macro base station H1, a primary small cell M1, and a primary small cell M2. When it is assumed that the macro base station H1 is used as the target backhaul node for the normal small cell S2, a throughput sum of home subscribers (UE 7 and UE 8) to the macro base station H1 is calculated based on access link resource pre-occupation information of the normal small cell S2, link quality information between the normal small cell S2 and the macro base station H1, and available backhaul link resource information of the macro base station H1, and is denoted as "W1". Then, when it is assumed that the primary small cell M1 is used as the target backhaul node for the normal small cell S2, a throughput sum of the home subscribers (UE 7 and UE 8) to the primary small cell M1 is calculated based on access link resource pre-occupation information of the normal small cell S2, link quality information between the normal small cell S2 and the primary small cell M1, and available backhaul link resource information of the primary small cell M1, and is denoted as "W2". Then, when it is assumed that the primary small cell M2 is used as the target backhaul node for the normal small cell S2, a throughput sum of the home subscribers (UE 7 and UE 8) to the primary small cell M2 is calculated based on access link resource pre-occupation information of the normal small cell S2, link quality information between the normal small cell S2 and the primary small cell M2, and available backhaul link resource information of the primary small cell M2, and is denoted as "W3". When it is assumed that W2 is the largest in W1, W2, and W3, the primary small cell W1 is used as the target backhaul node for the normal small cell S2. A method for determining a backhaul node for another normal small cell is similar to the foregoing method. Details are not described.

S211. The central control node sends a third message to the normal small cell.

The third message includes an identifier of the target backhaul node, and the communication link resource information between the normal small cell and the target backhaul node. The normal small cell sends data to the target backhaul node, and/or receives data from the target backhaul node, by using the communication link resource information between the normal small cell and the target backhaul node.

In some embodiments, the method may include:

S212. The central control node sends a fourth message to the target backhaul node.

The fourth message includes the communication link resource information between the normal small cell and the target backhaul node. The target backhaul node sends data to the normal small cell, and/or receives data from the normal small cell, by using the communication link resource information between the normal small cell and the target backhaul node. The fourth message may further include an identifier of the normal small cell.

In this embodiment, the central control node determines the target backhaul node for the normal small cell from the M candidate backhaul nodes and the communication link resource information between the normal small cell and the target backhaul node based on the access link resource pre-occupation information of the normal small cell, the link quality information between the normal small cell and each of the M candidate backhaul nodes, and the available backhaul link resource information sent by the M candidate backhaul nodes. The target backhaul node for the normal small cell and the communication link resource information between the normal small cell and the target backhaul node are determined by the central control node with reference to the access link resource pre-occupation information of the normal small cell, the link quality information between the normal small cell and each of the M candidate backhaul nodes, and the available backhaul link resource information sent by the M candidate backhaul nodes. Therefore, the target backhaul node is determined more properly, and the communication link resource information between the normal small cell and the target backhaul node is also more proper, improving system performance.

For specific implementation of S210, the present invention further provides an embodiment shown in FIG. 4. FIG. 4 is a schematic flowchart of another possible resource allocation method according to an embodiment of the present invention. The method in this embodiment is as follows:

S401. Initialize an intermediate variable that needs to be used during resource allocation and a resource allocation output variable.

S402. A central control node obtains system information required for the resource allocation.

The system information required for the resource allocation includes access link resource pre-occupation information of a normal small cell, link quality information between the normal small cell and each of M candidate backhaul nodes, available backhaul link resource information sent by the M candidate backhaul nodes, and the like.

Specific sub-steps are as follows:

Each normal small cell measures access link resource pre-occupation information of the normal small cell, and reports the access link resource pre-occupation information to the central control node.

Each normal small cell measures link quality information between the normal small cell and each of the M candidate backhaul nodes, and reports the link quality information to the central control node, and the central control node can obtain each backhaul link efficiency.

The candidate backhaul node reports the available backhaul link resource information to the central control node.

S403. Perform a resource allocation procedure.

The following sub-steps are included:

For an $m^{th}$ normal small cell, if an $n^{th}$ target backhaul node provides a backhaul service to the $m^{th}$ normal small cell on a $k_{th}$ resource unit, a target end-to-end throughput requirement of the normal small cell is $R_U$, and a capacity of a link from the target backhaul node to a core network is $R_C$, an access resource proportion $\alpha_{m,n,k}$ required for meeting the service in this case, a backhaul link resource proportion $\beta^{m,n,k}$, and a sensible end-to-end throughput $R_{m,n,k}$ can be obtained based on the following method.

$$\begin{cases} \alpha = T = R/\log_2\ (1 + SINR_A) \\ \beta = R/\log_2\ (1 + SINR_B) \end{cases} \quad \text{if } R \leq R_{th}$$

$$\begin{cases} \alpha = \min\left(\dfrac{\log_2\ (1 + SINR_B)/R \cdot c}{1/T + \log_2\ (1 + SINR_B)/R}, T\right) \\ \beta = \min\left(\dfrac{\log_2\ (1 + SINR_A)/R \cdot c}{1/T + \log_2\ (1 + SINR_B)/R}, \dfrac{R}{\log_2\ (1 + SINR_B)}\right) \end{cases} \quad \text{if } R > R_{th}$$

Herein, $$R_{th} = \frac{\log_2\ (1 + SINR_B)/T \cdot c}{1/T + \log_2\ (1 + SINR_B)/R}$$

indicates an end-to-end throughput threshold in a connection relationship for the $m^{th}$ normal small cell if it is assumed that the $n^{th}$ target backhaul node provides the backhaul service to the $m^{th}$ normal small cell on the $k^{th}$ resource unit, R=min ($R_U$, $R_C$) indicates a throughput capability of a non-air interface link, c indicates an available available resource proportion on a particular resource unit, $SINR_A$ indicates a receiving signal to interference plus noise ratio of an access link, $SINR_B$ indicates a receiving signal to interference plus noise ratio of a backhaul link, and T indicates an access link resource required proportion when a target rate is R.

In terms of the entire formula, allocation of the access resource proportion and the backhaul link resource proportion may include two cases. In one case, the target rate is less than the throughput threshold. In this case, because the end-to-end throughput is limited by a minimum value of each hop link, only impact of the target rate needs to be considered for the allocation of the access resource proportion and the backhaul link resource proportion. In addition, because an end-to-end rate can be maximized when two hop rates are equal, it may be obtained that each of the access resource proportion and the backhaul link resource proportion is inversely proportional to transmission efficiency of the two hop links. In the other case, the target rate is greater than the throughput threshold. In this case, there are two specific cases. To be specific, when the backhaul link is a transmission bottleneck, the backhaul link needs to be centrally optimized. In this case, the access link throughput is not less than the backhaul link throughput, and the backhaul link throughput is less than the target rate. Therefore, the corresponding access resource allocation proportion and the backhaul link resource allocation proportion can be obtained through deduction. When the access link becomes a bottleneck, similarly, the access link needs to be centrally optimized. In this case, the backhaul link throughput is not less than the access link throughput, and the access link throughput is less than the target rate. Therefore, a same resource allocation result can be obtained through deduction.

For all normal small cells, target backhaul nodes, and resource units, calculation is performed based on the foregoing method, to find a combination with a maximum end-to-end throughput. For example, if a throughput sum of home subscribers served by an $(m')^{th}$ normal small cell for the $n^{th}$ target backhaul node is maximum, $n^{(m')}$ and $k^{(m')}$ respectively indicate a target backhaul node for the normal small cell and a resource unit corresponding to transmission, $R_{m,n,k}$ indicates an end-to-end throughput that can be achieved when subscribers served by the $m^{th}$ normal small cell perform backhaul on the $k^{th}$ resource unit by using the $n^{th}$ target backhaul node, a resource allocation result may be obtained as follows:

$$(m', n^{(m')}, k^{(m')}) = \arg\max_{m,n,k} R_{m,n,k}$$

The foregoing formula means to find a normal small cell, a target backhaul node, and a corresponding resource unit that have a maximum end-to-end throughput from all connection relationships. An end-to-end throughput of the subscribers, an access link resource allocation proportion, and a backhaul link resource allocation proportion are correspondingly obtained as follows:

$$R_{m'} = R_{m',n^{(m')},k^{(m')}}$$

$$\alpha_{m'} = \alpha_{m',n^{(m')},k^{(m')}}$$

$$\beta_{m'} = \beta_{m',n^{(m')},k^{(m')}}$$

S404. Update a quantity of available backhaul link resources of an $(m')^{th}$ normal small cell and that of a target backhaul node related to the $(m')^{th}$ normal small cell.

The available backhaul link resources of the target backhaul node are updated to:

$$c_{n^{(m')},k^{(m')}} = c_{n^{(m')},k^{(m')}} - \beta_{m',n^{(m')},k^{(m')}}$$

A link throughput between the target backhaul node and the core network is updated to:

$$R_{C,n^{(m')}} = R_{C,n^{(m')}} - R_{m'}$$

An available resource proportion of the normal small cell is updated to:

$$c_{m',k^{(m')}} = c_{m',k^{(m')}} - \beta_{m',n^{(m')},k^{(m')}} - \alpha_{m',n^{(m')},k^{(m')}}$$

S405. If $R_{m'} \geq R_{U,m'}$, the $(m')^{th}$ normal small cell quits the resource allocation; or if $R_{m'} < R_{U,m'}$, a data rate required by the normal small cell is updated to $R_{U,m'} = R_{U,m'} - R_{m'}$.

S406. Repeat steps S402 to S405 until all normal small cells meet a service requirement or all resources are used up.

Figure 5:
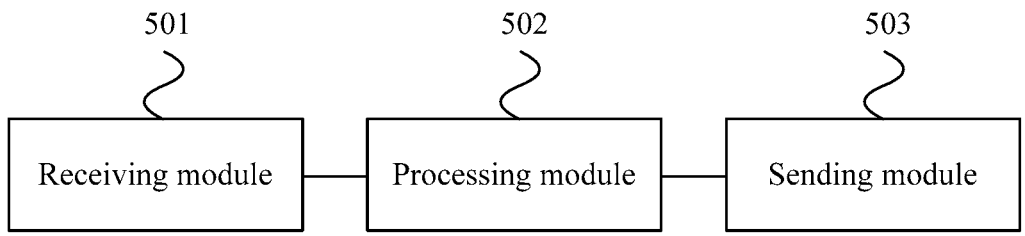
FIG. 5 is a schematic structural diagram of a central control node according to an embodiment of the present invention.

FIG. 5 is a schematic structural diagram of a central control node according to an embodiment of the present invention. The central control node in this embodiment includes a receiving module 501, a processing module 502, and a sending module 503. The receiving module 501 is configured to receive a first message sent by a normal small cell, where the first message includes access link resource pre-occupation information of the normal small cell. The receiving module 501 is further configured to receive a second message sent by the normal small cell, where the second message includes link quality information between the normal small cell and each of M candidate backhaul nodes, and M is an integer greater than or equal to 2. The receiving module 501 is further configured to receive available backhaul link resource information sent by the M candidate backhaul nodes. The processing module 502 is configured to determine a target backhaul node for the normal small cell from the M candidate backhaul nodes and communication link resource information between the normal small cell and the target backhaul node based on the access link resource pre-occupation information of the normal small cell, the link quality information between the normal small cell and each of the M candidate backhaul nodes, and the available backhaul link resource information sent by the M candidate backhaul nodes. The sending module 503 is configured to send a third message to the normal small cell, where the third message includes an identifier of the target backhaul node and the communication link resource information between the normal small cell and the target backhaul node.

In some embodiments, the sending module 503 is further configured to send a fourth message to the target backhaul node, where the fourth message includes the communication link resource information between the normal small cell and the target backhaul node.

In some embodiments, the fourth message further includes an identifier of the normal small cell.

In some embodiments, the processing module 502 is specifically configured to: calculate, based on the access link resource pre-occupation information of the normal small cell, the link quality information between the normal small cell and each of the M candidate backhaul nodes, and the available backhaul link resource information sent by the M candidate backhaul nodes, a corresponding throughput sum of all home subscribers served by the normal small cell for each candidate backhaul node, to obtain M throughput sums; and determine a candidate backhaul node corresponding to a maximum throughput sum in the M throughput sums as the target backhaul node.

In some embodiments, the sending module 503 is further configured to send a first indication message to the normal small cell, where the first indication message is used to instruct the normal small cell to report the access link resource pre-occupation information of the normal small cell, and the first indication message includes first reporting information and/or a first reporting trigger condition.

In some embodiments, the sending module 503 is further configured to send a second indication message to the normal small cell, where the second indication message is used to instruct the normal small cell to measure the access link resource pre-occupation information of the normal small cell, and the second indication message includes first measurement information and/or a first measurement trigger condition.

In some embodiments, the sending module 503 is further configured to send a third indication message to the normal small cell, where the third indication message is used to instruct the normal small cell to report the link quality information between the normal small cell and each of the M candidate backhaul nodes, and the third indication message includes second reporting information and/or a second reporting trigger condition.

In some embodiments, the sending module 503 is further configured to send a fourth indication message to the normal small cell, where the fourth indication message is used to instruct the normal small cell to measure the link quality information between the normal small cell and each of the M candidate backhaul nodes, and the fourth indication message includes second measurement information and/or a second measurement trigger condition.

In some embodiments, the second measurement information includes at least one of the following:
 a quantity of to-be-measured candidate backhaul nodes;
 a measurement manner; or
 precision of a measured parameter.

In some embodiments, the first reporting trigger condition includes:
 periodic triggering or event triggering.

In some embodiments, the first measurement trigger condition includes:
 periodic triggering or event triggering.

In some embodiments, the second reporting trigger condition includes:
 periodic triggering or event triggering.

In some embodiments, the second measurement trigger condition includes:
 periodic triggering or event triggering.

The apparatus in this embodiment shown in FIG. 5 may be correspondingly configured to perform corresponding steps performed by the central control node in the method embodiment shown in FIG. 2, and implementation principles and technical effects thereof are similar. Details are not described herein again.

Figure 6:
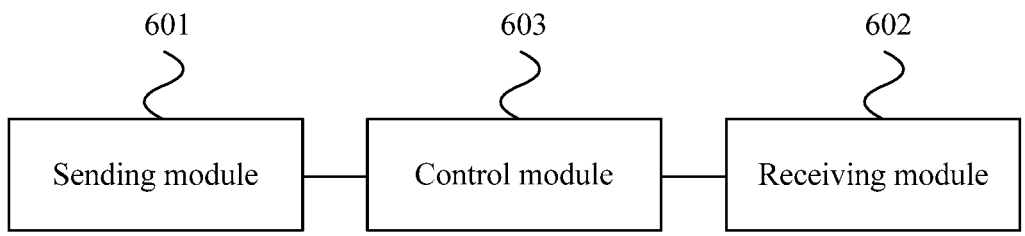
FIG. 6 is a schematic structural diagram of a normal small cell according to an embodiment of the present invention.

FIG. 6 is a schematic structural diagram of a normal small cell according to an embodiment of the present invention. The normal small cell in this embodiment includes a sending module 601, a receiving module 602, and a control module 603. The sending module 601 is configured to send a first message to a central control node, where the first message includes access link resource pre-occupation information of the normal small cell. The sending module 601 is further configured to send a second message to the central control node, where the second message includes link quality information between the normal small cell and each of M candidate backhaul nodes, and M is an integer greater than or equal to 2. The receiving module 602 is configured to receive a third message sent by the central control node, where the third message includes an identifier of a target backhaul node for the normal small cell and communication link resource information between the normal small cell and the target backhaul node. The control module 603 is configured to: control the sending module to send data to the target backhaul node by using the communication link resource information between the normal small cell and the target backhaul node, and/or control the receiving module to receive data from the target backhaul node by using the communication link resource information between the normal small cell and the target backhaul node.

In some embodiments, the receiving module 602 is further configured to receive a first indication message sent by the central control node, where the first indication message is used to instruct the normal small cell to report the access link resource pre-occupation information of the normal small cell, and the first indication message includes first reporting information and/or a first reporting trigger condition.

In some embodiments, the receiving module 602 is further configured to receive a second indication message sent by the central control node, where the second indication message is used to instruct the normal small cell to measure the access link resource pre-occupation information of the normal small cell, and the second indication message includes first measurement information and/or a first measurement trigger condition; and
 the control module 603 is further configured to measure the access link resource pre-occupation information of the normal small cell based on the second indication message.

In some embodiments, the receiving module 602 is further configured to receive a third indication message sent by the central control node, where the third indication message is used to instruct the normal small cell to report the link quality information between the normal small cell and each of the M candidate backhaul nodes, and the third indication message includes second reporting information and/or a second reporting trigger condition.

In some embodiments, the receiving module 602 is further configured to receive a fourth indication message sent by the central control node, where the fourth indication message is used to instruct the normal small cell to measure the link quality information between the normal small cell and each of the M candidate backhaul nodes, and the fourth indication message includes second measurement information and/or a second measurement trigger condition.

In some embodiments, the second measurement information includes at least one of the following:
 a quantity of to-be-measured candidate backhaul nodes;
 a measurement manner; or
 precision of a measured parameter.

In some embodiments, the first reporting trigger condition includes:
 periodic triggering or event triggering.

In some embodiments, the first measurement trigger condition includes:
 periodic triggering or event triggering.

In some embodiments, the second reporting trigger condition includes:
 periodic triggering or event triggering.

In some embodiments, the second measurement trigger condition includes:
 periodic triggering or event triggering.

The apparatus in this embodiment shown in FIG. 6 may be correspondingly configured to perform corresponding steps performed by the normal small cell in the method embodiment shown in FIG. 2, and implementation principles and technical effects thereof are similar. Details are not described herein again.

Figure 7:
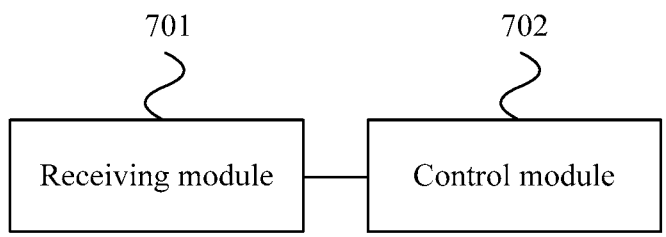
FIG. 7 is a schematic structural diagram of a target backhaul node according to an embodiment of the present invention.

FIG. 7 is a schematic structural diagram of a target backhaul node according to an embodiment of the present invention. The target backhaul node in this embodiment includes a receiving module 701 and a control module 702. The receiving module 701 is configured to receive a second message sent by a central control node, where the second message includes link quality information between a normal small cell and the target backhaul node. The receiving module 701 is further configured to receive a fourth message sent by the central control node, where the fourth message includes communication link resource information between the normal small cell and the target backhaul node. The control module 702 is configured to: control a sending module to send data to the normal small cell by using the communication link resource information between the normal small cell and the target backhaul node, and/or control the receiving module to receive data from the normal small cell by using the communication link resource information between the normal small cell and the target backhaul node.

The fourth message further includes an identifier of the normal small cell.

The apparatus in this embodiment shown in FIG. 7 may be correspondingly configured to perform corresponding steps performed by the target backhaul node in the method embodiment shown in FIG. 2, and implementation principles and technical effects thereof are similar. Details are not described herein again.

Figure 8:
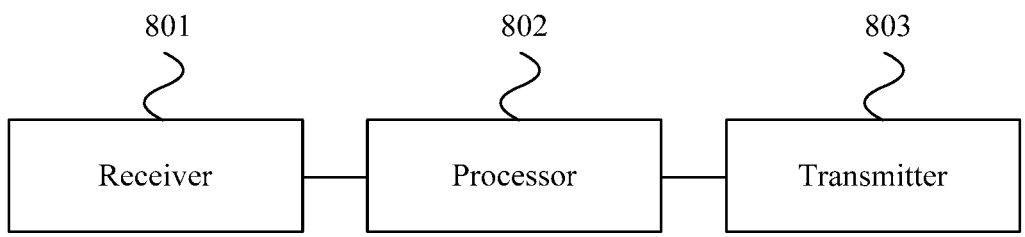
FIG. 8 is another schematic structural diagram of a central control node according to an embodiment of the present invention.

FIG. 8 is another schematic structural diagram of a central control node according to an embodiment of the present invention. The central control node in this embodiment includes a receiver 801, a processor 802, and a transmitter 803. The receiver 801 is configured to receive a first message sent by a normal small cell, where the first message includes access link resource pre-occupation information of the normal small cell. The receiver 801 is further configured to receive a second message sent by the normal small cell, where the second message includes link quality information between the normal small cell and each of M candidate backhaul nodes, and M is an integer greater than or equal to 2. The receiver 801 is further configured to receive available backhaul link resource information sent by the M candidate backhaul nodes.

The processor 802 is configured to determine a target backhaul node for the normal small cell from the M candidate backhaul nodes and communication link resource information between the normal small cell and the target backhaul node based on the access link resource pre-occupation information of the normal small cell, the link quality information between the normal small cell and each of the M candidate backhaul nodes, and the available backhaul link resource information sent by the M candidate backhaul nodes. The transmitter 803 is configured to send a third message to the normal small cell, where the third message includes an identifier of the target backhaul node and the communication link resource information between the normal small cell and the target backhaul node.

The apparatus in this embodiment shown in FIG. 8 may be correspondingly configured to perform corresponding steps performed by the central control node in the method embodiment shown in FIG. 2, and implementation principles and technical effects thereof are similar. Details are not described herein again.

Figure 9:
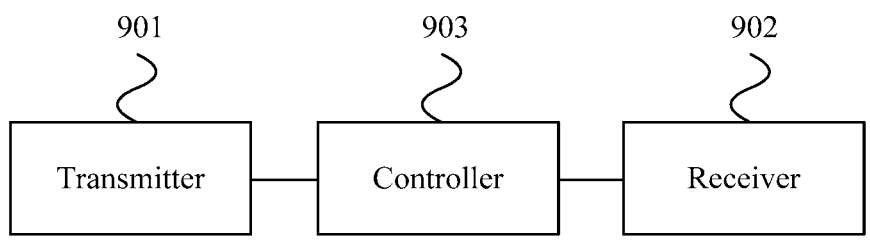
FIG. 9 is another schematic structural diagram of a normal small cell according to an embodiment of the present invention.

FIG. 9 is another schematic structural diagram of a normal small cell according to an embodiment of the present invention. The normal small cell in this embodiment includes a transmitter 901, a receiver 902, and a controller 903. The transmitter 901 is configured to send a first message to a central control node, where the first message includes access link resource pre-occupation information of the normal small cell. The transmitter 901 is further configured to send a second message to the central control node, where the second message includes link quality information between the normal small cell and each of M candidate backhaul nodes, and M is an integer greater than or equal to 2. The receiver 902 is configured to receive a third message sent by the central control node, where the third message includes an identifier of a target backhaul node for the normal small cell and communication link resource information between the normal small cell and the target backhaul node. The controller 903 is configured to: control the transmitter to send data to the target backhaul node by using the communication link resource information between the normal small cell and the target backhaul node, and/or control the receiver to receive data from the target backhaul node by using the communication link resource information between the normal small cell and the target backhaul node.

The apparatus in this embodiment shown in FIG. 9 may be correspondingly configured to perform corresponding steps performed by the normal small cell in the method embodiment shown in FIG. 2, and implementation principles and technical effects thereof are similar. Details are not described herein again.

Figure 10:
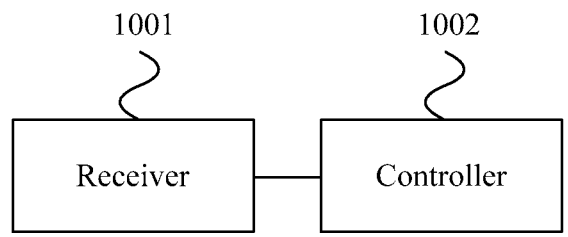
FIG. 10 is another schematic structural diagram of a target backhaul node according to an embodiment of the present invention.

FIG. 10 is another schematic structural diagram of a target backhaul node according to an embodiment of the present invention. The target backhaul node in this embodiment includes a receiver 1001 and a controller 1002. The receiver 1001 is configured to receive a second message sent by a central control node, where the second message includes link quality information between a normal small cell and the target backhaul node. The receiver 1001 is further configured to receive a fourth message sent by the central control node, where the fourth message includes communication link resource information between the normal small cell and the target backhaul node. The controller 1002 is configured to: control a transmitter to send data to the normal small cell by using the communication link resource information between the normal small cell and the target backhaul node, and/or control the receiver to receive data from the normal small cell by using the communication link resource information between the normal small cell and the target backhaul node.

The apparatus in this embodiment shown in FIG. 10 may be correspondingly configured to perform corresponding steps performed by the target backhaul node in the method embodiment shown in FIG. 2, and implementation principles and technical effects thereof are similar. Details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, for example, a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A resource allocation method, comprising:
receiving, by a central control node, a first message sent by a first cell, wherein the first message comprises access link resource pre-occupation information regarding resource occupation on an access link to the first cell;
receiving, by the central control node, a second message sent by the first cell, wherein the second message comprises link quality information between the first cell and each of M candidate backhaul nodes, and M is an integer greater than or equal to 2;
receiving, by the central control node, available backhaul link resource information sent by the M candidate backhaul nodes;
determining, from the M candidate backhaul nodes, by the central control node, a target backhaul node for the first cell and communication link resource information between the first cell and the target backhaul node based on the access link resource pre-occupation information, the link quality information between the first cell and each of the M candidate backhaul nodes, and the available backhaul link resource information sent by the M candidate backhaul nodes;
sending, by the central control node, a third message to the first cell, wherein the third message comprises an identifier of the target backhaul node and the communication link resource information between the first cell and the target backhaul node;
wherein determining, from the M candidate backhaul nodes, by the central control node, the target backhaul node for the first cell based on the access link resource pre-occupation information; the link quality information between the first cell and each of the M candidate backhaul nodes, and the available backhaul link resource information sent by the M candidate backhaul nodes comprises:
calculating, by the central control node, based on the access link resource pre-occupation information, the link quality information between the first cell and each of the M candidate backhaul nodes, and the available backhaul link resource information sent by the M candidate backhaul nodes, a corresponding throughput sum of all subscribers served by the first cell for each candidate backhaul node, to obtain M throughput sums; and
determining, by the central control node, a candidate backhaul node corresponding to a maximum throughput sum in the M throughput sums as the target backhaul node.

2. The method according to claim 1, further comprising:
sending, by the central control node, a fourth message to the target backhaul node, wherein the fourth message comprises the communication link resource information between the first cell and the target backhaul node.

3. The method according to claim 2, wherein the fourth message further comprises an identifier of the first cell.

4. The method according to claim 1, wherein before receiving, by the central control node, the first message sent by a first cell, the method further comprises:
sending, by the central control node, a first indication message to the first cell, wherein the first indication message includes information for instructing the first cell to report the access link resource pre-occupation information, wherein the first indication message comprises at least one of a first reporting information or a first reporting trigger condition.

5. The method according to claim 4, wherein before sending, by the central control node, the first indication message to the first cell, the method further comprises:
sending, by the central control node, a second indication message to the first cell, wherein the second indication message includes information for instructing the first cell to measure the access link resource pre-occupation information, wherein the second indication message comprises at least one of a first measurement information or a first measurement trigger condition.

6. The method according to claim 1, wherein before receiving, by the central control node, the second message sent by the first cell, the method further comprises:
sending, by the central control node, a third indication message to the first cell, wherein the third indication message includes information for instructing the first cell to report the link quality information between the first cell and each of the M candidate backhaul nodes, wherein the third indication message comprises at least one of a second reporting information or a second reporting trigger condition.

7. The method according to claim 6, wherein before sending, by the central control node, the third indication message to the first cell, the method further comprises:
sending, by the central control node, a fourth indication message to the first cell, wherein the fourth indication message includes information for instructing the first cell to measure the link quality information between the first cell and each of the M candidate backhaul nodes, wherein the fourth indication message comprises at least one of a second measurement information or a second measurement trigger condition.

8. A resource allocation method, comprising:
sending, by a first cell, a first message to a central control node, wherein the first message comprises access link resource pre-occupation information regarding resource occupation on an access link to the first cell;
sending, by the first cell, a second message to the central control node, wherein the second message comprises link quality information between the first cell and each of M candidate backhaul nodes, and M is an integer greater than or equal to 2;
receiving, by the first cell, a third message sent by the central control node, wherein the third message comprises an identifier of a target backhaul node for the first cell and communication link resource information between the first cell and the target backhaul node;
sending, by the first cell, data to the target backhaul node, or receiving data from the target backhaul node by using the communication link resource information between the first cell and the target backhaul node;
calculating, by the central control node, based on the access link resource pre-occupation information, the link quality information between the first cell and each of the M candidate backhaul nodes, and the available backhaul link resource information sent by the M candidate backhaul nodes, a corresponding throughput sum of all subscribers served by the first cell for each candidate backhaul node, to obtain M throughput sums; and
determining, by the central control node, a candidate backhaul node corresponding to a maximum throughput sum in the M throughput sums as the target backhaul node.

9. The method according to claim 8, wherein
before sending, by the first cell, the first message to a central control node, the method further comprises:
receiving, by the first cell, a first indication message sent by the central control node, wherein the first indication message includes information for instructing the first cell to report the access link resource pre-occupation information, and the first indication message comprises at least one of a first reporting information or a first reporting trigger condition.

10. The method according to claim 9, wherein before the first cell reports the access link resource pre-occupation information based on the first indication message, the method further comprises:
receiving, by the first cell, a second indication message sent by the central control node, wherein the second indication message includes information for instructing the first cell to measure the access link resource pre-occupation information, and the second indication message comprises at least one of a first measurement information or a first measurement trigger condition; and
measuring, by the first cell, the access link resource pre-occupation information of the first cell based on the second indication message.

11. The method according to claim 8, wherein before the sending, by the first cell, a second message to the central control node, the method further comprises:
receiving, by the first cell, a third indication message sent by the central control node, wherein the third indication message includes information for instructing the first cell to report the link quality information between the first cell and each of the M candidate backhaul nodes, wherein the third indication message comprises at least one of a second reporting information or a second reporting trigger condition.

12. The method according to claim 11, wherein before receiving, by the first cell, the third indication message sent by the central control node, the method further comprises:
receiving, by the first cell, a fourth indication message sent by the central control node, wherein the fourth indication message includes information for instructing the first cell to measure the link quality information between the first cell and each of the M candidate backhaul nodes, and the fourth indication message comprises at least one of a second measurement information or a second measurement trigger condition.

13. A resource allocation apparatus, comprising:
a receiver, configured to:
receive a first message sent by a first cell, wherein the first message comprises access link resource pre-occupation information regarding resource occupation on an access link to the first cell,
receive a second message sent by the first cell, wherein the second message comprises link quality information between the first cell and each of M candidate backhaul nodes, and M is an integer greater than or equal to 2, and
receive available backhaul link resource information sent by the M candidate backhaul nodes;
a processor, configured to determine a target backhaul node for the first cell from the M candidate backhaul nodes and communication link resource information between the first cell and the target backhaul node based on the access link resource pre-occupation information, the link quality information between the first cell and each of the M candidate backhaul nodes, and the available backhaul link resource information sent by the M candidate backhaul nodes; and
a transmitter, configured to send a third message to the first cell, wherein the third message comprises an identifier of the target backhaul node and the communication link resource information between the first cell and the target backhaul node;
wherein the processor is configured to: calculate, based on the access link resource pre-occupation information, the link quality information between the first cell and each of the M candidate backhaul nodes, and the available backhaul link resource information sent by the M candidate backhaul nodes, a corresponding throughput sum of all subscribers served by the first cell for each candidate backhaul node, to obtain M throughput sums; and
determine a candidate backhaul node corresponding to a maximum throughput sum in the M throughput sums as the target backhaul node.

14. The apparatus according to claim 13, wherein the transmitter is further configured to send a fourth message to the target backhaul node, wherein the fourth message comprises the communication link resource information between the first cell and the target backhaul node.

15. The apparatus according to claim 13, wherein the transmitter is further configured to send a first indication message to the first cell, wherein the first indication message is used to instruct the first cell to report the access link resource pre-occupation information, and the first indication message comprises at least one of a first reporting information or a first reporting trigger condition.

16. The apparatus according to claim 15, wherein the transmitter is further configured to send a second indication message to the first cell, wherein the second indication message includes information for instructing the first cell to measure the access link resource pre-occupation information of the first cell, wherein the second indication message comprises at least one of a first measurement information or a first measurement trigger condition.

17. The apparatus according to claim 13, wherein the transmitter is further configured to send a third indication message to the first cell, wherein the third indication message includes information for instructing the first cell to report the link quality information between the first cell and each of the M candidate backhaul nodes, wherein the third indication message comprises at least one of a second reporting information or a second reporting trigger condition.

18. The apparatus according to claim 17, wherein the transmitter is further configured to send a fourth indication message to the first cell, wherein the fourth indication message includes information for instructing the first cell to measure the link quality information between the first cell and each of the M candidate backhaul nodes, wherein the fourth indication message comprises at least one of a second measurement information or a second measurement trigger condition.

* * * * *